United States Patent [19]

Bollinger et al.

[11] Patent Number: 5,029,722
[45] Date of Patent: Jul. 9, 1991

[54] FUEL VAPOR CONTROL SYSTEM

[75] Inventors: Steven R. Bollinger, Chesterfield; William A. Hagen, St. Ann; Lawrence Clements, St. Louis, all of Mo.

[73] Assignee: Carter Automotive Company, Inc., St. Louis, Mo.

[21] Appl. No.: 577,221

[22] Filed: Sep. 4, 1990

[51] Int. Cl.$^5$ ............................................. B65D 51/16
[52] U.S. Cl. ............................. 220/203; 220/85 VR; 220/85 VS; 220/86.2
[58] Field of Search ....................... 220/203, 209, 85 S, 220/85 V, 85 VR, 85 VS, 86.2, DIG. 33

[56] References Cited

U.S. PATENT DOCUMENTS

| | | | |
|---|---|---|---|
| 4,701,198 | 10/1987 | Uranishi et al. | 220/85 VR |
| 4,719,949 | 1/1988 | Mears | 220/85 VS |
| 4,765,504 | 8/1988 | Sherwood et al. | 220/85 VS |
| 4,809,863 | 3/1989 | Woodcock et al. | 220/85 VS |
| 4,946,060 | 8/1990 | Sherwood et al. | 220/85 VS |

Primary Examiner—Joseph Man-Fu Moy
Attorney, Agent, or Firm—Lawrence J. Shurupoff

[57] ABSTRACT

An anti-pollution mechanism usable on the filler tubes of automotive fuel tanks to prevent vaporous hydrocarbons from escaping from the tank through the tube, especially at the instant when the closure cap at the mouth of the tube is initially opened such as required during refueling. A vapor escape line extends from the fuel tank to a vapor collection canister. A pressure-operated valve in the escape line is automatically opened in response to opening of the cap on the filler tube such that vapors and fumes escape through the line instead of flowing out of the tube mouth.

17 Claims, 1 Drawing Sheet

FUEL VAPOR CONTROL SYSTEM

BACKGROUND OF THE INVENTION

1. Field of the Invention

This invention relates to a pressure responsive valve mechanism for preventing undesired escape of fuel vapor from the fuel tank in an automotive vehicle during refueling.

2. Description of Prior Developments

During normal operation of automotive vehicles such as cars, trucks, buses and vans, the fuel tank often becomes slightly pressurized due to the accumulation of fuel vapor in the confined space above the liquid fuel. This pressurized condition is especially likely during hot weather periods when the fuel vapor pressure is higher. When liquid fuel is added to the fuel tank, the pressurized vapor has an open path to the atmosphere via the opened closure cap at the mouth of the fuel tank filler tube. The pressurized vapor can flow rapidly out through the tube, thereby polluting the ambient atmosphere. Such escape of the vapor can be detected as an audible hissing sound associated with rapid outflow of fuel vapors through the filler tube.

A venting mechanism shown in U.S. Pat. No. 4,572,394 issued to T. Tanahashi, et al addresses the problem of fuel vapor escape during refueling by providing a canister of activated charcoal around the mouth of the filler tube. In contrast, the newly proposed mechanism described in detail below is adapted to use a conventional activated charcoal canister used for venting the fuel tank during normal vehicle operation. Moreover, the newly proposed arrangement locates a control valve remote from the fuel tank and filler tube where possible clog-up due to atmospheric contamination is not as likely as in the case of the patented arrangement of Tanahashi, et al.

Also, the newly-proposed arrangement includes a rigid rugged guide structure for a fuel dispenser nozzle, whereas the arrangement of the '394 patent includes a rubber bellows guide structure for the nozzle. Service life of the guide structure in U.S. Pat. No. 4,572,394 could be a problem.

SUMMARY OF THE INVENTION

The present invention concerns a mechanism that is responsive to opening movement of a fuel tank closure cap to automatically open an auxiliary valve in a vapor escape line leading from the fuel tank to a vapor collector such as an activated charcoal canister. The operation is such that when the cap is opened, any accumulated vapor in the tank is directed away from the filler tube through an alternate escape route which exits through the vapor collector, thereby overcoming the pollution problem.

The newly proposed mechanism includes a control valve operated by pressures existing on opposite faces of a movable partition within the control valve housing. The partition is preferably a diaphragm, although it could be a piston or a bellows. One operating face of the partition is exposed to the pressure existing in the fuel tank. The other control face of the partition is in fluid pressure communication with the filler tube at a point near its mouth.

When the filler tube is closed by a removable cap, the pressures on opposite faces of the partition are equalized. One face of the partition is in axial registry with an outlet port in the valve housing, such that the partition is closed against the port by the area differential resulting from the area of the outlet port which is in contact with only one side of the partition. As an alternative, or as a supplementary feature, a compression spring can be positioned against the partition to normally hold it in a closed position against the outlet port.

When the cap at the mouth of the filler tube is operated to open the filler tube preparatory to a refueling operation, atmospheric pressure is communicated to the control face of the partition through a control line leading from the mouth of the filler tube to the valve housing. The relatively lower atmospheric pressure on the control face of the partition enables the partition to be deflected to an open condition by the higher pressure of the fuel vapor such that pressurized vapor can then flow from the fuel tank through the opened valve. The action is such that pressurized vapor is drawn away from the filler tube and routed through a filter, thereby lessening the potential for polluting the atmosphere.

IN THE DRAWINGS

The single figure of the drawing shows a system embodying the invention. Certain components of the system are shown in section to illustrate structural features.

DESCRIPTION OF THE PREFERRED EMBODIMENT OF THE INVENTION

Figure 1:
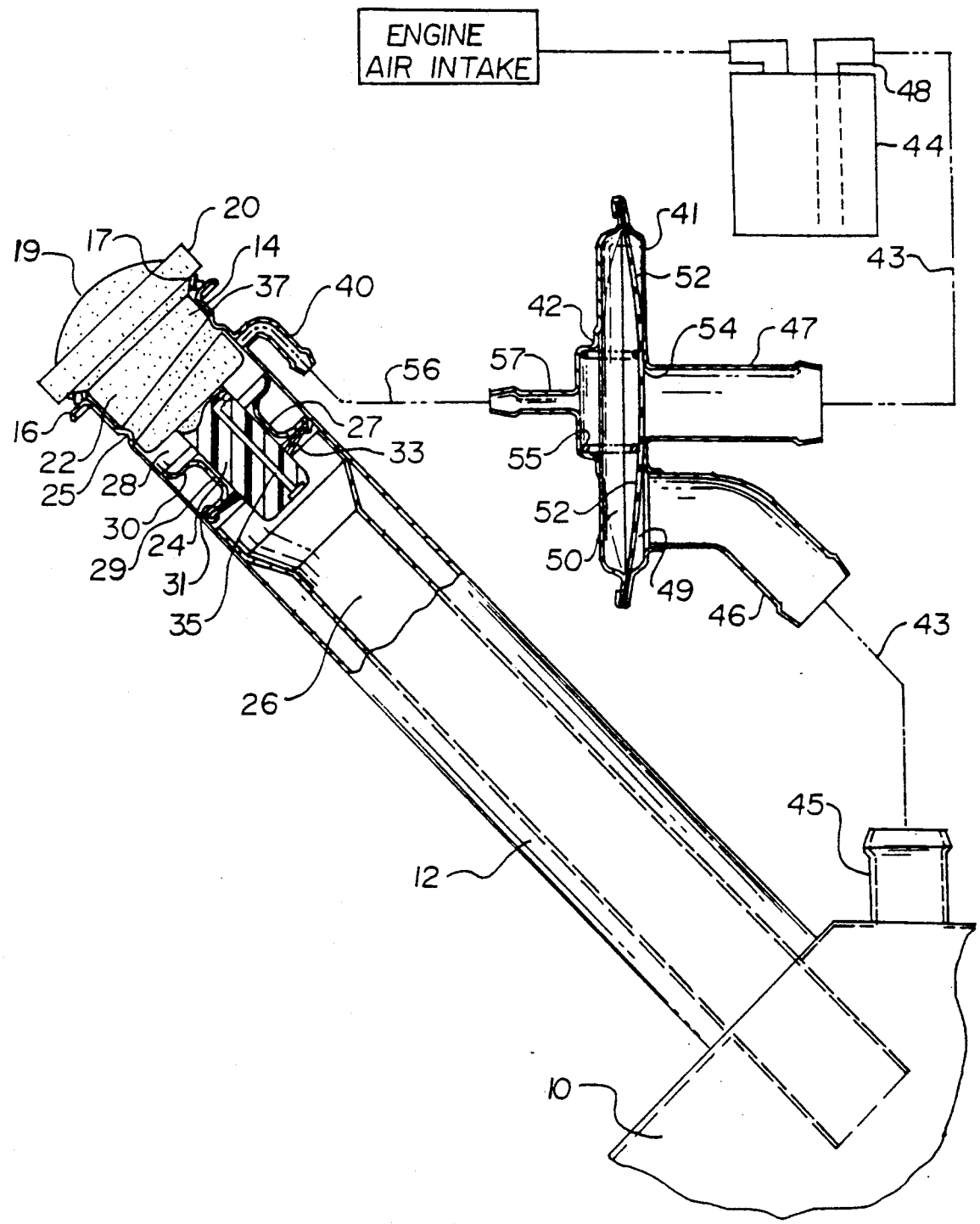

The drawing shows a fuel storage system for use within an automotive vehicle. The system includes a fuel tank 10 having an upwardly angled filler tube 12 that terminates in an open mouth 14. A radial flange 16 extends from the tube mouth to form a radial sealing surface for an annular seal 17 carried on a removable closure cap 19.

Cap 19 includes an outer manually-engageable portion 20 located beyond the end of tube 12, a relatively large diameter plug section 22 fitting into the open mouth of tube 12, and a relatively small diameter plug section 24 extending axially from section 22. A single helical groove is formed in the side surface of cap section 22 for meshed engagement with a helical spline 25 on the inner side surface of filler tube 12. The construction is such as to permit cap 19 to be inserted into and onto the fuel filler tube with a manual screw-on turning motion. The cap can be completely removed from the filler tube with a reverse screw-off motion. When the cap is fully inserted onto the tube, seal 17 has sealing engagement with flange 16.

A fuel nozzle guide structure 27 is welded or otherwise fixedly mounted within tube 12 in axial spaced relation to tube mouth 14. Guide structure 27 includes a hollow cylinder 29 having radial end flanges 30 and 31 attached to the inner surface of tube 12. An annular deflectable flap seal 33 is mounted onto flange 31, as by a crimping operation. Seal 33 has an internal diameter that is less than the internal diameter of cylinder 29, such that when cap 19 is fully inserted into tube 12 the inner annular edge of seal 33 will sealably engage the cylindrical side surface of cap section 24.

An L-shaped bleed passage 35 extends from the end face of plug section 24 to the outer cylindrical side surface of plug section 24, thereby forming a pressure connection between lower main space 26 within tube 12 and upper annular space 28 within tube 12, i.e. the space between seal 33 and the tube mouth 14. The diameter of plug section 22 is made to be slightly smaller than the internal diameter of the tube mouth 14, such that the pressure in annular space 28 is communicated to a spigot fitting 40 suitably attached to the wall of tube 12. An annular clearance 37 exists between the outer surface of cap section 22 and the inner surface of the tube 12.

A normally-closed valve 42 is operatively located between fuel tank 10 and a vapor collector 44 such as a charcoal canister. Valve 42 is located in a vapor escape line designated diagrammatically by numeral 43. In practice the vapor escape line can be formed by two sections of small diameter tubing, e.g. five eighth inch diameter tubing, telescoped onto spigot structures 45, 46, 47 and 48 that extend from the fuel tank, valve housing, and vapor collector, respectively. This arrangement is particularly advantageous in those vehicles normally equipped with a vapor collector as no additional collector is required to carry out the invention.

Valve 42 includes a housing 41 that is subdivided into a flow chamber 49 and a control chamber 50 by an imperforate flexible diaphragm or partition 52. As shown in full lines, the partition is deflected rightwardly to sealably engage the wall of an outlet port 54, thereby preventing vapor flow from fuel tank 10 to collector 44.

A compression spring 55 may be located in chamber 50 to augment the force provided by the pressure of the fluid vapor in that chamber. The effective force on the left face of partition 52 is or may be normally greater than the force on the partition right face, due to the presence of spring 55 and also due to the fact that the effective area of the partition right face is decreased by its area of contact with flow port 54.

A control line 56 such as a one eighth inch diameter hose extends from a spigot structure 57 on valve housing 41 to the spigot 40 on filler tube 12. When cap 19 is in a closed position (as shown) the pressures on opposite faces of partition 52 will be equalized except for pressure surges that are damped out by the small diameter bleed passage 35. Spring 55 and the differential partition area due to port 54 will maintain partition 52 in a closed condition.

When cap 19 is manually unscrewed from tube 12, seal 17 will move axially away from tube flange 16, thereby opening a vent path through annular clearance 37. With seal 33 still engaged with plug section 24 of the cap, the pressure in control chamber 50, which is typically greater than ambient, will be quickly vented through the associated line 56 and clearance space 37, thereby enabling the pressure in flow chamber 49 to deflect partition 52 leftwardly away from port 54. An escape path is thereby formed for vapor otherwise trapped within tank 10. Vapor will begin to flow from tank 10 through vapor line 43 before plug section 24 of cap 19 moves out of contact with seal 33. Any pressurized vapor in tube space 26 will tend to be drawn downwardly from the tube into tank 10, rather than escaping upwardly through the tube.

Structure 27 serves as a mounting surface for seal 33, and also as a guide structure for a conventional fuel dispenser nozzle (not shown). After cap 19 is completely removed from tube 12 the fuel nozzle is inserted into tube 19 to feed liquid fuel, e.g. gasoline, through the tube into the tank. Hollow cylinder 29 will encircle the lower end portion of the nozzle, while seal 33 is sealably engaged against the nozzle side surface. Seal 33 will prevent the upflow of fumes or vapors through tube 12 during the refueling operation.

Seal 33 could be located on flange 30 instead of on flange 31. However, in its illustrated position the seal is in a shielded portion, such that when the fuel nozzle is initially inserted into the filler tube 19, structure 27 acts as a protector for seal 33 so that the tip of the nozzle is not likely to forcibly engage or destroy the seal.

The drawing shows a particular system embodying the invention. It will be appreciated that variations in the system could be used while still practicing the invention.

What is claimed is:

1. In combination, an automotive fuel tank having a filler tube and a manually-operated screwable closure cap normally closing said tube;
   vapor collection means;
   a vapor escape line leading from said tank to said vapor collection means;
   a normally-closed fluid pressure actuated valve in said vapor escape line, said valve being opened and/or closed by fluid pressure within said vapor escape line; and
   means responsive to opening screwing movement of the cap for operating said valve to an open condition.

2. The combination of claim 1, wherein said means responsive comprises a control line extending between the valve and the filler tube, and a bleed passage extending through the closure cap to normally form a pressure connection between the control line and the fuel tank via the filler tube.

3. The combination of claim 2, wherein said means responsive further comprises a first seal interposed between the closure cap and the filler tube to normally preclude fluid flow from the filler tube around the bleed passage to the control line, and a second seal interposed between the cap and the filler tube to normally prevent fluid flow between the external atmosphere and the control line; said seals being located so that during opening movement of the cap the second seal is unsealed before the first seal, whereby the control line is then vented to the atmosphere.

4. The combination of claim 1, wherein said filler tube has an open mouth terminating in a flange; said closure cap having a first relatively large diameter section adapted to normally extend through the open mouth of the filler tube and a second relatively small diameter section extending axially from the large diameter section for disposition within the tube; a first seal carried by the filler tube for sealing engagement with the side surface of the small diameter section, a second seal carried by the cap for sealing engagement with the filler tube flange; said responsive means comprising a control line extending between the valve and a point on the filler tube between said second seal and the filler tube flange; and a bleed passage extending through the small diameter section of the cap to normally form a pressure connection between the control line and the fuel tank via the filler tube.

5. The combination of claim 4, wherein the small diameter section of the cap has a sufficient length that when the cap is opened the first seal maintains sealing contact with the cap until after the second seal has become unsealed from the filler tube flange.

6. The combination of claim 5, wherein the diameter of the large diameter cap section is slightly less than the internal diameter of the filler tube mouth, such that a vent space is provided between the control line and the second seal.

7. The combination of claim 5, further comprising a fuel nozzle guide neck structure located within the filler tube so that when the cap is in its closed position the small diameter section of the cap extends through the neck structure.

8. The combination of claim 7, wherein said first seal is mounted on the neck structure in a shielded position, whereby during entry of the nozzle into the filler tube the nozzle strikes the neck structure prior to contact with the first seal.

9. The combination of claim 8, wherein the first seal is an annular resilient flap seal having an inner diameter that is slightly less than the effective diameter of the nozzle guide neck structure.

10. The combination of claim 8, wherein said nozzle guide neck structure comprises a hollow cylinder having radial end flanges engaged with the inner surface of the filler tube.

11. The combination of claim 10, wherein said first seal is an annular resilient lip seal extending radially along one of the radial end flanges on the nozzle guide neck structure.

12. The combination of claim 1, wherein said valve comprises a valve housing and a diaphragm subdividing said housing into a control chamber and a flow chamber.

13. The combination of claim 11 wherein said means responsive comprises a control line extending between the control chamber of the valve housing and the filler tube, and a bleed passage extending through the closure cap to normally form a pressure connection between the control line and the fuel tank via the filler tube.

14. The combination of claim 11, wherein said valve housing includes a vapor inlet port in communication with the fuel tank and a vapor outlet port in communication with the vapor collection means; said outlet port being located on the axis of the diaphragm, whereby deflection of the diaphragm in the closing direction causes the diaphragm to seat against said outlet port.

15. In combination, an automotive fuel tank having a filler tube equipped with an open mouth, and a manually-operated screwable closure cap normally seated against said mouth to close the filler tube;
 a vapor collection means remote from said tank;
 a vapor escape line leading from the tank to said vapor collection means;
 a normally-closed fluid pressure actuated valve in said vapor escape line, said valve being opened and/or closed by fluid pressure within said vapor escape line; and
 means responsive to opening screwing movement of the cap for operating said valve to an open condition;
 said valve comprising a valve housing and a movable partition subdividing said housing into a control chamber and a flow chamber, said valve housing having a vapor outlet port located on the movement axis of the partition whereby said partition is seatable against said outlet port to prevent vapor flow through the valve;
 said responsive means comprising a first annular seal carried on the filler tube remote from the filler tube mouth for engagement against a side surface of the closure cap, a second annular seal carried by the closure cap for engagement against the mouth of the filler tube, a control line extending between the valve housing and a point on the filler tube located between said first seal and said filler tube mouth, and a bleed passage extending through the closure cap to normally form a pressure connection between the control line and the fuel tank via the filler tube.

16. The combination of claim 15, wherein said second seal is engaged against a radial end surface of the filler tube, and said first seal is engaged against an axial side surface of the cap, such that when the cap is opened the second seal becomes unsealed before the first seal.

17. The combination of claim 15, wherein said closure cap comprises a cylindrical plug normally extending through a central opening in said first seal, said cylindrical plug having an end face communicating with the fuel tank via the filler tube; said bleed passage including an axial passage section extending from the plug end face and a radial passage section extending from the axial section to the plug side face in free communication with the control line.

18. The combination of claim 15, wherein said bleed passage has a diameter substantially less than the diameter of the control line.

* * * * *

UNITED STATES PATENT AND TRADEMARK OFFICE
CERTIFICATE OF CORRECTION

PATENT NO. : 5,029,722

DATED : July 9, 1991

INVENTOR(S) : Steven R. Bollinger, William A. Hagen, Lawrence Clements

It is certified that error appears in the above-identified patent and that said Letters Patent is hereby corrected as shown below:

Column 5, line 25:
Claim 13, line 1, "11" should read -- 12 --.
Column t, line 31:
Claim 14, line 1, "11" should read -- 12 --.

Signed and Sealed this

Twentieth Day of October, 1992

Attest:

DOUGLAS B. COMER

Attesting Officer     Acting Commissioner of Patents and Trademarks